United States Patent [19]

Yokoyama et al.

[11] Patent Number: 4,578,879

[45] Date of Patent: Apr. 1, 1986

[54] FLUIDIZING APPARATUS

[75] Inventors: Takeshi Yokoyama, Tamano; Haruyuki Koda, Ootake; Matsunao Maeda, Iwakuni; Keiji Kobayashi, Ootake; Masafumi Aoba, Okayama; Masaaki Miwa, Yokohama, all of Japan

[73] Assignee: Mitsui Engineering and Shipbuilding Co., Ltd., Tokyo, Japan

[21] Appl. No.: 664,535

[22] Filed: Oct. 25, 1984

[30] Foreign Application Priority Data

Nov. 8, 1983 [JP] Japan .................. 58-172957[U]

[51] Int. Cl.$^4$ .................................... F26B 17/10
[52] U.S. Cl. .................. 34/57 A; 34/57 R; 432/58
[58] Field of Search .............. 34/57 A, 10; 432/15, 432/58; 110/245

[56] References Cited

U.S. PATENT DOCUMENTS

| | | | |
|---|---|---|---|
| 2,715,565 | 8/1955 | McKay | 432/58 |
| 3,782,903 | 1/1974 | Kramer | 34/57 A |
| 4,257,171 | 3/1981 | Johnson et al. | 34/57 A |

Primary Examiner—Larry I. Schwartz
Attorney, Agent, or Firm—Parkhurst & Oliff

[57] ABSTRACT

An improved fluidizing apparatus includes a gas distribution plate which is supported by support means located below the level of the gas distribution plate. The support means comprises beam members extending across the interior of the vessel and a number of rods standing upright on the beam members, with the gas distribution plate placed on the uppermost ends of the rods. The support means can also include annular members made integral with the beam members and/or a projection or projections projecting inward from the inner wall surface of the vessel. A number of rods can stand upright on the annular members.

25 Claims, 12 Drawing Figures

FLUIDIZING APPARATUS

BACKGROUND OF THE INVENTION

1. Field of the Invention

The present invention relates to a fluidizing apparatus and more particularly to a fluidizing apparatus of the type in which gas is used as a fluidizing medium.

2. Description of the Prior Art

As is well known, a gas distribution plate, such as a perforated plate, is provided at a predetermined position in a vessel constituting a fluidizing apparatus, for instance at the lower end of the vessel, and the interior of the vessel is divided into two chambers, upper and lower chambers, by the gas distribution plate. The lower chamber is provided with piping connected thereto, and gas introduced into the lower chamber through the piping flows through the gas distribution plate so that a fluidized bed is formed in the upper chamber.

In one type of conventional fluidizing apparatus, the gas distribution plate is typically supported in the vessel by placing its peripheral edge on a plurality of projections projecting inward from the inner wall surface of the vessel. In another conventional fluidizing apparatus, the vessel is separated into two halves, an upper half and a lower half, at the level at which the gas distribution plate is provided, so that it is firmly held between the upper and lower halves when they are assembled.

However, a problem inherent to these conventional fluidizing apparatus is that the gas distribution plate cannot support the heavy weight of the fluidized bed formed above it. For this reason, conventional fluidizing apparatuses are limited to a certain specific type, for instance a small type.

To resolve this problem, another conventional fluidizing apparatus is constructed such that beam-shaped support members are arranged in the form of lattice across the interior of the vessel, so as to carry the gas distribution plate. However, it has been found that this type of conventional fluidizing apparatus tends to cause the deposition of powder, grains, or similar fine particles carried by the fluidizing gas on the support members, at the corners where they come into contact with the gas distribution plate, and the bottom surface thereof, when the fluidizing gas introduced into the lower chamber contains powdery materials. As the fluidizing apparatus continues operating, the volume of unwanted fine particles deposited thereon increases gradually, until a number of the holes in the gas distribution plate are clogged with the fine particles.

When the gas distribution plate has clogged holes, the fluidization gas passing therethrough is reduced, so that it becomes still or irregular in the fluidizing bed. As a result, grain, granular material or the like in the fluidizing bed coheres each other and becomes clods on the gas distribution plate, which forces the fluidizing apparatus to stop operating.

SUMMARY OF THE INVENTION

The present invention has been devised with this background in mind.

It is an object of the present invention to provide an improved fluidizing apparatus which assures that the deposition of fine particles on members supporting the gas distribution plate is greatly reduced, so that stable operation can continue for a long period of time without the problems attributable mainly to a clogged gas distribution plate.

It is another object of the present invention to provide an improved fluidizing apparatus which ensures that the gas distribution plate is firmly supported by the aid of support means, irrespective of the weight of the fluidized bed formed on the gas distribution plate.

It is a third object of the present invention to provide an improved fluidizing apparatus which ensures that a large gas distribution plate is safely supported by support means.

To accomplish these objects, the present invention proposes a fluidizing apparatus of the type including a vessel, a gas distribution plate provided horizontally in the vessel, and means for supporting the gas distribution plate, the support means being located at a position below the level of the gas distribution plate, wherein the improvement consists in that the support means comprises a plurality of beam members extending across the interior of the vessel, and a number of rods standing upright on the beam members as far as the level of the gas distribution plate, so that the gas distribution plate is supported on the uppermost ends of the rods.

In a preferred embodiment of the invention, the support means further includes a plurality of annular members integral with the beam members, and a number of rods standing upright on the annular members. The support means may also include a projection or projections projecting inward from the inner wall surface of the vessel so that the gas distribution plate can be further supported by placing the peripheral edge portion thereof on the projection or projections.

Other objects, features and advantages of the present invention will become more apparent from the following description, which has been prepared in conjunction with the accompanying drawings.

BRIEF DESCRIPTION OF THE DRAWINGS

The accompanying drawings are briefly described below.

DESCRIPTION OF THE PREFERRED EMBODIMENTS

The present invention will be described in greater detail hereunder, with reference to the accompanying drawings which illustrate preferred embodiments thereof.

Figure 1:
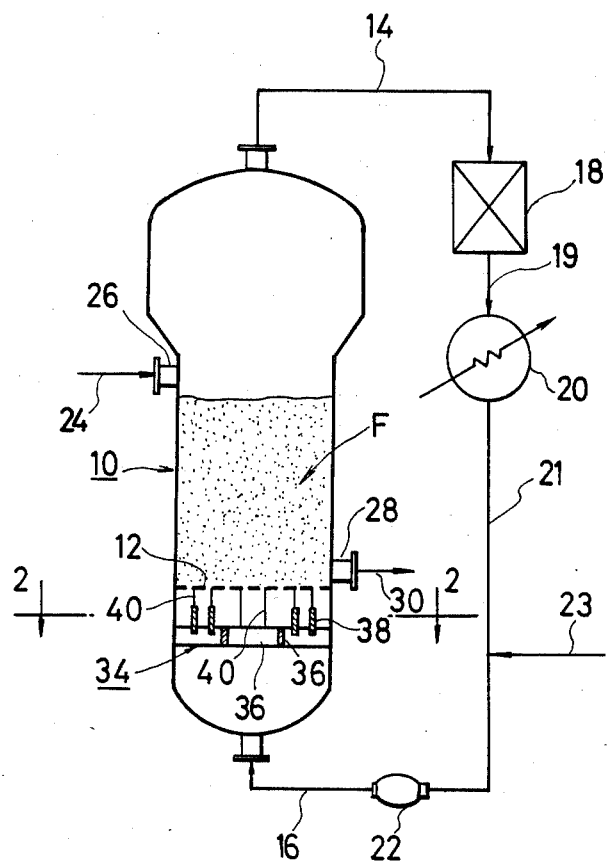
FIG. 1 is a schematic vertically-sectioned view of a fluidizing apparatus in accordance with a first embodiment of the present invention.
Figure 2:
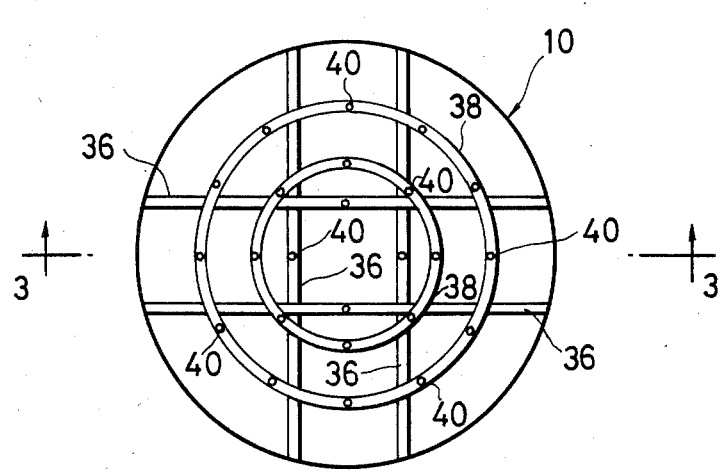
FIG. 2 is a section through the fluidizing apparatus, taken along the line 2—2 of FIG. 1.
Figure 3:
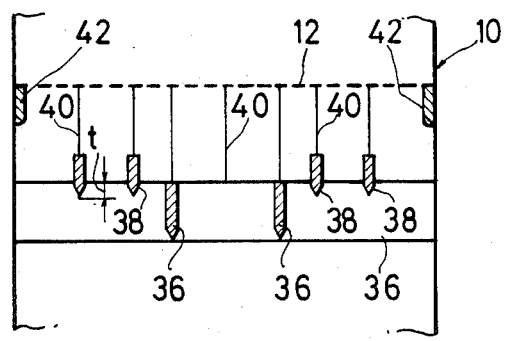
FIG. 3 is a fragmentary vertical section through the fluidizing apparatus, taken along the line 3—3 of FIG. 2.

The description will concerns a fluidizing apparatus in accordance with a first embodiment of the invention, with reference to FIGS. 1 to 3.

The fluidizing apparatus illustrated in FIG. 1 is designed to produce polyolefin in the form of granules by a polymerization step which is carried out in the presence of catalyst.

In the drawing, reference numeral 10 denotes a vessel of the fluidizing apparatus of the present invention, in which a polymerization reaction takes place. The vessel 10 is provided with a gas distribution plate (perforated plate) 12 in a lower end part thereof, and a fluidizing bed F is formed in the space above the gas distribution plate 12. A gas exhaust pipe 14 is connected to the uppermost end of the vessel 10, and an olefin gas delivery pipe 16 is connected to the lowermost end thereof so that olefin gas as a raw material can be introduced into the vessel 10 through the delivery pipe 16. As is apparent from the drawing, the gas exhaust pipe 14 and the gas delivery pipe 16 communicate with one another through a collector 18, a pipe 19, a gas cooler 20, a pipe 21, and a blower 22 so as to provide a gas recirculation system. It should be noted that the collector 18 collects therein fine particles carried by the gas flowing through the exhaust pipe 14, and a pipe 23 is connected to the pipe 21 at a position located midway along the gas recirculation system so as to supply the olefin gas acting as the raw material.

The catalyst required for the polymerization is introduced into the vessel 10 through a pipe 24 and an inlet port 26 in the side wall of the vessel 10.

When the fluidizing apparatus constructed in this manner starts operating, recirculating gas which includes olefin gas as the raw material is introduced into the bottom of the reaction vessel 10 through the pipe 16. The introduced gas flows through the gas distribution plate 12, and then enters the space located above the gas distribution plate 12. Thus the catalyst introduced into the fluidized bed and the granular polyolefin produced as a result of the polymerization reaction are brought into a fluidized state.

The raw material gas is subjected to the polymerization reaction when it comes into contact with the catalyst, to produce granular polyolefin. Granular polyolefin which has already been produced is made to grow so that its diameter increases.

Granular polyolefin in the fluidized bed F is removed from the reaction vessel 10 as a reaction product 30 through an outlet port 28 in the side wall at a lower part of the reaction vessel 10.

The description below concerns the support means for the gas distribution plate 12 in the fluidizing apparatus according to the first embodiment of the invention.

In the first embodiment of the invention, the support means for the gas distribution plate 12 comprises a plurality of beam members 36 extending across the interior of the reaction vessel 10, a plurality of annular members 38 provided integrally with the beam members 36, and a number of rods 40 standing upright from both the beam members 36 and the annular members 38, as illustrated in FIGS. 2 and 3. As is apparent from the drawings, the beam members 36 and the annular members 38 are located below the gas distribution plate 12.

In this embodiment, the support means for the gas distribution plate 12 also includes a plurality of projections 42 projecting inward from the inner wall of the vessel 10. The projections 42 are arranged in a spaced relationship around the inner surface of the vessel wall. Alternatively, the plurality of projections can be replaced by a single annular projection surrounding the inner wall of the vessel 10.

In the illustrated embodiment, the support means includes four beam members 36 or which both ends are attached to the inner surface of the wall by welding or bolt connection. As illustrated in FIG. 2, two beam members extend orthogonally with respect to the other two beam members.

The support means also includes two annular members 38 which are arranged in a coaxial relationship in such a manner that their lower edges overlap the upper edges of the beam members 36 to some extent. The beam members 36 are made integral with the annular members 38 by welding or bolt connection. In FIG. 3, reference letter t denotes the length by which the beam members 36 overlap the annular members 38.

A number of rods 40 extend in the vertical direction from the beam members 36 and the annular members 38, so that their upper ends reach a level flush with the upper surface of the projections 42. The rods 40 can be solid, or hollow in the form of pipes.

The gas distribution plate 12 is mounted in the vessel 10 by supporting it on both the rods 40 and the projections 42. In the first embodiment, the fluidizing apparatus is provided with projections 42, but the present invention should not be limited to this, the fluidizing apparatus can be without projections.

It should be noted that the numbers of beam members 36, annular members 38, and rods 40 should not be limited to those illustrated in the drawings, but can be determined as appropriate according to the inner diameter of the reaction vessel 10 and the reactive conditions thereon, etc.

Figure 4:
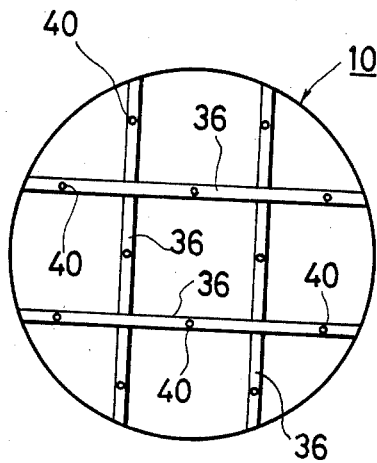
FIG. 4 is a cross-section similar to that of FIG. 2, illustrating a fluidizing apparatus in accordance with a second embodiment of the present invention.
Figure 5:
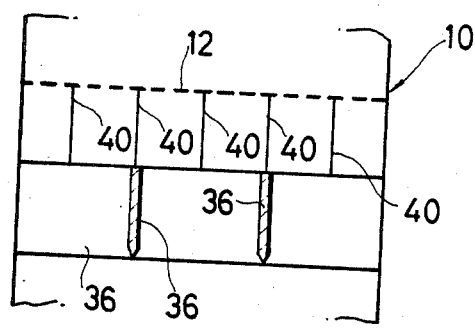
FIG. 5 is a fragmentary vertically-sectioned view similar to FIG. 3, illustrating the fluidizing apparatus of FIG. 4.
Figure 6E:
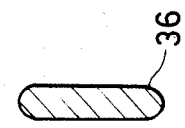
FIGS. 6(A) to (E) are each cross-sections through beam members supporting the gas distribution plate, illustrating different cross-sectional configurations of the beam members.
Figure 6D:
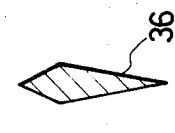
Figure 6C:
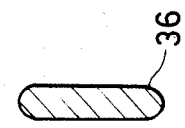
Figure 6B:
Figure 6A:

The description below concerns support means for a gas distribution plate in a fluidizing apparatus in accordance with a second embodiment of the invention, with reference to FIGS. 4 and 5.

In the second embodiment of the invention, the support means for the gas distribution plate comprises merely a combination of beam members 36 and rods 40. In this embodiment as well, two beam members 36 extend at right angles to another two beam members 36, and all the beam members 36 are attached to the inner wall surface of the vessel 10 in the same manner as in the first embodiment. The rods 40 stand upright on the beam members 36. As is apparent from the drawings, the second embodiment differ from the first in that the vessel 10 is not provided with a projection around the inner surface of the vessel wall, like the projections 42 in the first embodiment. However, a projection or projections could be provided in the same manner as in the first embodiment.

As will be readily understood from the above description concerning the support mechanism for the gas distribution plate, the beam members 36 and the annular members 38 are located some distance from the gas distribution plate 12. Because of this arrangement of the gas distribution plate 12, the effects of turbulence in the gas flow caused by gas colliding against the gas distribution plate 12 are not transmitted to the area in the proximity of the beam members 36 and the annular members 38, so that gas continues to flow smoothly in the area where the beam members 36 and the annular members 38 are arranged. Thus the beam members 36 and the annular members 38 are protected from the deposition of fine particles due to turbulence in the gas flow. Even if a large quantity of fine particles is deposited on the beam members 36 and the annular members 38 for some reason, the gas distribution plate 12 is not adversely affected by this deposition of fine particles, because it is some distance away. This ensures that the gas distribution plate 12 never becomes clogged with foreign material.

Since each of the rods 40 is in direct contact with the gas distribution plate 12 over a very small contact area, so that very little fine particles are deposited thereon, the gas distribution plate 12 is not clogged with fine particles deposited on the rods 40.

It should be noted that the numbers of beam members 36 and rods 40 should not be limited to those illustrated in the drawings, but can be determined as appropriate according to the inner diameter of the reaction vessel 10 and the reactive conditions thereon, etc.

In the foregoing embodiments, when the rods 40 stand vertical, the load carried by the gas distribution plate 12, including its own dead weight, is exerted on the rods 40 in the axial direction, so that an extremely high resistance to bending is ensured thereby. For this reason, it is possible to reduce the diameter of the rods 40 to an extremely small dimension, for instance, less than 20 mm. Obviously a reduction of the diameter of the rods 40 leads to a reduction in their surface area, so that the deposition of fine particles is further reduced.

In both the first and second embodiments, it is preferable that the beam members 36 and the annular members 38 have a cross-sectional configuration such that the attachment and deposition of fine particles thereon is minimized. FIGS. 6(A) to (E) illustrate several examples of such preferable cross-sectional configurations. The cross-sectional configurations illustrated in FIGS. 6(A) to (D) taper downward, while the cross-sectional configuration illustrated in FIG. 6(E) has a rounded bottom. When the design is such that each member has a gradually-reducing thickness toward the bottom edge thereof, little turbulance in the gas flow occurs along the lower parts of the beam members 36 and the annular members 38, so that the deposition of granular material thereon is further reduced.

The distance between the gas distribution plate 12 and the beam members 36 and the annular members 38 is preferably determined to be such that any deposition layer on the beam members 36 and the annular members 38 does not grow as far as to reach the bottom surface of the gas distribution plate 12. In practice, this distance is preferably more than about 30 mm, more preferably more than 50 mm.

Figure 7B:
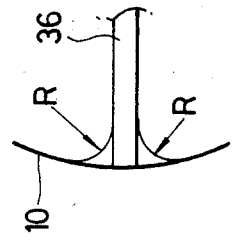
FIG. 7(B) is a fragmentary cross-section through the vessel, particularly illustrating deposit welded portions in an area at which one beam member intersects another orthogonally.
Figure 7A:
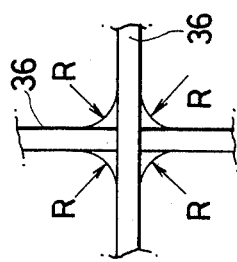
FIG. 7(A) is a fragmentary cross-section through the vessel, particularly illustrating deposit welded portions in an area at which the beam members abut against the side wall of the vessel.

When the connections of the beam members 36 to the annular members 38, the connections of the beam members 36 to each other, and the connection of the beam members 36 to the inner wall surface of the vessel 10 is done by welding, it is preferable that deposit welding with a concave cross-sectional configuration is used for corner areas where beam members abut against the side wall of the vessel or one beam member intersects another, as illustrated in FIGS. 7(A) and (B). The deposited portion should have a radius of curvature R which is as large as possible, within the capability range of welding techniques. This is because an increased radius of curvature R leads to a further reduced deposition on the corner portions.

It should also be noted that the length of each overlapped portion (the portions identified by reference letter t in FIG. 3) where part of one beam member 36 overlaps part of an annular member 38, is preferably determined to be as short as possible within a permissible range defined by the strength thereof. The reason for this is that a reduction of the length of the overlapped portion at which two members 36, 38 intersect, where the deposition of fine particles at these corner areas is likely, contributes to a reduced deposition thereof.

While the present invention has been described above with respect to the case in which granular polyolefin is produced in a fluidizing apparatus, it should of course be understood that it should not be limited thereto, and that various changes or modifications may be made in any acceptable manner without departing from the spirit and scope of the present invention. For instance, the present invention may be applied to a chemical reaction apparatus or a chemical synthesizing apparatus with a fluidized bed incorporated therein, such as an apparatus for synthesizing acrylic nitrile, an apparatus for producing phthalic acid anhydride, an apparatus used for drying, calcining or burning, an apparatus used for mixing, shieving or granulating, an apparatus for gasifying coal, or any similar apparatus.

What is claimed is:

1. In a fluidizing apparatus of the type provided with a vessel, a gas distribution plate arranged horizontally within said vessel, and means for supporting said gas distribution plate, said support means being located at a position below the level of said gas distribution plate, a fluidizing apparatus wherein said support means comprises beam members extending across the interior of said vessel and rods standing upward on said beam members so as to extend as far as said level of said gas distribution plate, so that said gas distribution plate is supported on the uppermost ends of the rods, each of said beam members having a cross-sectional configuration such that the thickness thereof is gradually reduced toward the bottom thereof.

2. The fluidizing apparatus as defined in claim 1, wherein said vessel is provided with a projection or projections projecting inward from the inner wall surface thereof so as to support the peripheral edge portion of said gas distribution plate.

3. The fluidizing apparatus as defined in claim 1, wherein said beam members intersect orthogonally.

4. The fluidizing apparatus as defined in claim 2, wherein said beam members intersect orthogonally.

5. The fluidizing apparatus as defined in claim 1, wherein said support means for supporting said gas distribution plate comprises said beam members, one or more annular members made integral with said beam members, and a number of rods standing upward on said beam members and said annular members so as to extend as far as said level of said gas distribution plate.

6. The fluidizing apparatus as defined in claim 5, wherein said vessel is provided with a projection or projections projecting inward from the inner wall surface thereof so as to support the peripheral edge portion of said gas distribution plate.

7. The fluidizing apparatus as defined in claim 5, wherein each of said beam members has a cross-sectional configuration such that the thickness thereof is gradually reduced toward the bottom thereof.

8. The fluidizing apparatus as defined in claim 6, wherein each of said beam members has a cross-sectional configuration such that the thickness thereof is gradually reduced toward the bottom thereof.

9. The fluidizing apparatus as defined in claim 5, wherein said beam members intersect orthogonally.

10. The fluidizing apparatus as defined in claim 6, wherein said beam members intersect orthogonally.

11. The fluidizing apparatus as defined in claim 7, wherein said beam members intersect orthogonally.

12. The fluidizing apparatus as defined in claim 8, wherein said beam members intersect orthogonally.

13. In a fluidizing apparatus of the type provided with a vessel, a gas distribution plate arranged horizontally within said vessel, and means for supporting said gas distribution plate, said support means being located at a position below the level of said gas distribution plate, a fluidizing apparatus wherein said support means comprises beam members extending across the interior of said vessel and rods standing upward on said beam members so as to extend as far as said level of said gas distribution plate, so that said gas distribution plate is supported on the uppermost ends of the rods, and said beam members intersect orthogonally.

14. The fluidizing apparatus as defined in claim 13, wherein said vessel is provided with a projection or projections projecting inward from the inner wall surface thereof so as to support a peripheral edge portion of said gas distribution plate.

15. The fluidizing apparatus as defined in claim 13, wherein each of said beam members has a cross-sectional configuration such that the thickness thereof is gradually reduced toward the bottom thereof.

16. The fluidizing apparatus as defined in claim 14, wherein each of said beam members has a cross-sectional configuration such that the thickness thereof is gradually reduced toward the bottom thereof.

17. The fluidizing apparatus as defined in claim 13 wherein said support means for supporting said gas distribution plate comprises said beam members, one or more annular members integral with said beam members, and a number of rods standing upward on said beam members and said annular members so as to extend as far as said level of said gas distribution plate.

18. In a fluidizing apparatus of the type provided with a vessel, a gas distribution plate arranged horizontally within said vessel, means for supporting said gas distribution plate, said support means being located at a position below the level of said gas distribution plate, a fluidizing apparatus wherein said support means comprises beam members extending acorss the interior of said vessel, one or more annular members made integral with said beam members, and a number of rods standing upward on said beam members and said annular members so as to extend as far as said level of said gas distribution plate, so that said gas distribution plate is supported on the uppermost ends of the rods.

19. The fluidizing apparatus as defined in claim 18 wherein said vessel is provided with a projection or projections projecting inward from the inner wall surface thereof so as to support a peripheral edge portion of said gas distribution plate.

20. The fluidizing apparatus as defined in claim 18, wherein each of said beam members has a cross-sectional configuration such that the thickness thereof is gradually reduced toward the bottom thereof.

21. The fluidizing apparatus as defined in claim 19, wherein each of said beam members has a cross-sectional configuration such that the thickness thereof is gradually reduced toward the bottom thereof.

22. The fluidizing apparatus as defined in claim 18, wherein said beam members intersect orthogonally.

23. The fluidizing apparatus as defined in claim 19, wherein said beam members intersect orthogonally.

24. The fluidizing apparatus as defined in claim 20, wherein said beam members intersect orthogonally.

25. The fluidizing apparatus as defined in claim 21, wherein said beam members intersect orthogonally.

* * * * *

UNITED STATES PATENT AND TRADEMARK OFFICE
CERTIFICATE OF CORRECTION

PATENT NO. : 4,578,879

DATED : April 1, 1986

INVENTOR(S) : Takeshi YOKOYAMA et al

It is certified that error appears in the above-identified patent and that said Letters Patent is hereby corrected as shown below:

At item 73, please add the following assignee after "Mitsui Engineering and Shipbuilding Co., Ltd.,"
--and Mitsui Petrochemical Industries, Ltd.--

Signed and Sealed this

Twelfth Day of August 1986

[SEAL]

Attest:

DONALD J. QUIGG

*Attesting Officer*  *Commissioner of Patents and Trademarks*